3,062,803
HALOGEN-FREE CATALYST FOR ETHYLENE POLYMERIZATION
Alford G. Farnham, Mendham, and Guido B. Stampa, Plainfield, N.J., assignors to Union Carbide Corporation, a corporation of New York
No Drawing. Filed Apr. 30, 1958, Ser. No. 731,850
16 Claims. (Cl. 260—94.9)

This invention relates generally to polymerization of olefins and more particularly to halogen-free catalyst compositions for use in the polymerization of ethylene. Even more particularly the invention relates to catalyst compositions comprising organic vanadyl salts and organo-aluminum compounds.

Polymerization of olefins, particularly ethylene, is well known. Numerous means and substances have been proposed either to cause the polymerization to occur or to direct the reaction toward some desired product. A wide variety of metals, their salts and oxides, peroxy-type compounds which generate free radicals, acids, Friedel-Crafts catalysts, ultra-violet light, and cathode rays have been proposed with varying degrees of success. The so-called Ziegler catalyst compositions are probably the most widely known, especially the combination of an aluminum trialkyl compound and titanium halides such as titanium tetrachloride.

Even though combinations of these compounds induce polymerization of ethylene at a very favorable rate, there are disadvantages which create problems. Chief among these problems is the presence of residual chlorine in the polymerized product which often causes noticeable corrosion of molds and related apparatus used in processing the polymer. Various washing procedures have been devised to remove the chlorine from the resin before processing, but these have not been found to be entirely satisfactory. Evidence that some chlorine is chemically bound in the polymer molecules and is released during the hot processing operations may account for the washing procedures being not entirely adequate.

Catalysts which contain no halogen element have been proposed to overcome this problem of corrosion with varying degrees of success. Compounds of metals appearing in the periodic table of Deming in the area defined as group IV–B to and including VI–B have been broadly proposed with more specific attention being directed to zirconium and thorium organo compounds, particularly the acetyl-acetonates of these two metals. $V^{+3}$ acetylacetonates, and hydrated oxides of titanium and zirconium have also been investigated. All of these catalysts, however, produce slow rates of polymerization or low yields of polymer by comparison with titanium tetrachloride in polymerization reactions carried out at low pressures. When operating pressures of 50 to 150 atmospheres are used, ethylene polymerization rates are somewhat improved but are still comparatively slow, with reported polymer yields of not above 5 grams per gram of catalyst even under these strenuous conditions.

It has been further shown that vanadium esters of the type represented by $(RO)_3VO$ where R is an organic alkyl group, differ materially in catalytic activity from titanium esters of similar type, i.e., $Ti(OR)_4$, or from titanium trialkoxides. Whereas the titanium esters such as tetrabutyl titanate in combination with an aluminum alkyl bring about a rapid polymerization rate for ethylene, the principal product is the dimer. In the case of vanadium esters such as triethyl vanadate or tri-n-butyl vanadate, however, the polymerization rate is much slower but the polymer formed has a much higher molecular weight. Considerable amounts of low molecular weight wax are also produced which tend to make the resin brittle.

It is a general object therefore to overcome the disadvantages inherent in the use of prior art catalysts for the production of polyolefins.

It is a more specific object to provide catalyst compositions for olefin polymerization which contain no halogen.

It is a still more specific object to provide olefin polymerization catalyst compositions which cause minimum formation of low molecular weight waxes in ethylene polymerization reactions.

It has now been found that ethylene polymers may be produced free from halogen contamination and substantially free from boiling cyclohexane soluble wax by contacting monomeric ethylene with a catalyst composition comprising a halogen free organo-aluminum compound and a vanadyl salt in a suitable inert hydrocarbon solvent.

The organo-aluminum compounds constituting one part of the catalyst composition may be represented by the general formula $AlR_3$ where R is any monovalent alkyl or aryl hydrocarbon radical. These compounds are well known in the field of olefin polymerization and are utilized as one constituent in the conventional Ziegler catalyst. Tri-isobutyl aluminum has been found to be very satisfactory for the purpose of this invention, but tripropyl, triethyl, or any trialkyl or triaryl aluminum may be advantageously utilized without substantially altering the results.

The polymerization of ethylene in the presence of an organo-aluminum compound and a metal salt is generally conceived as operating according to a two-step mechanism in which the first step is the addition of ethylene to the organo-aluminum compound to form higher organo-aluminum compounds according to the following equation:

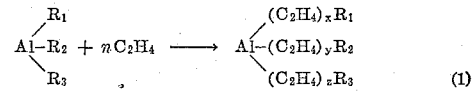

(1)

where $R_1$, $R_2$ and $R_3$ are the same or different alkyl or aryl groups in the first instance and ethyl groups thereafter and "x," "y" and "z" are whole numbers the sum of which is equal to "n."

The second step is a splitting or separation step in which the higher organic groups formed according to Equation 1 and which are bound to the aluminum are split off and are replaced by ethyl groups according to the following equation:

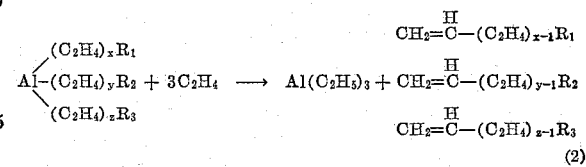

(2)

Reactions 1 and 2 in combination represent a true catalytic action, the resultant product of which is determined by the relative rate of the addition Reaction 1 to the splitting Reaction 2. The rate of addition with $AlR_3$ is slow at low temperatures but is nevertheless more rapid than the splitting or exchange reaction. However the increase in rate as the temperature is raised is greater for the splitting reaction than for the addition reaction. Thus the result of raising the temperature to a point where addition of ethylene to $AlR_3$ is at a practical rate for commercial usage, the splitting reaction has become the predominate factor and a low molecular weight polymer is obtained.

To enable the polymerization reaction to proceed rapidly and also form high molecular weight polymers, an activator or co-catalyst in the form of a metal or metal salt may be used in conjunction with the organo-aluminum catalyst. These activators, according to their nature and quantity, have a profound directing and accelerating effect on the polymerization, and generally determine the overall efficiency of the process.

A wide variety of metals and metal-containing inorganic compounds have been proposed as activators including titanium, zirconium, thorium and vanadium and generally compounds of the metals of groups IV–B to VI–B of the periodic table of Deming. Additionally, numerous organic compounds of certain metals, particularly vanadium, have been proposed which have varied effects on ethylene polymerization. These variations in activity are related to the differences in the chemical nature of the organic radicals linked to the metal atom, but the precise mechanism whereby the activity of the metal atom is influenced is not completely understood. Substantially and remarkably improved polymerization of ethylene, however, is now possible with the vanadyl salts included in the present invention.

Vanadyl compounds are characterized by having at least one oxygen atom covalently bonded to the vanadium atom and to no other atom. By the term vanadyl salts, as used in this invention, is meant organo-vanadium compounds having the general formula $(O=V)R_x$ where the valence of the $(O=V)$ radical is $+2$ and R is the residue of a carboxylic acid having one or two carboxyl groups and $x$ has a value of 1 when both carboxylic groups of a dibasic acid are linked to the $(O=V)^{++}$ group, and a value of 2 when only one carboxylic group of any R group is linked to the $(O=V)^{++}$ radical.

It is to be understood that it is necessary only that two carboxyl groups be linked to the $(O=V)^{++}$ radical. It is not necessary that both carboxyl groups of a dibasic acid be bonded to the $(O=V)^{++}$ group, but instead two different or identical dibasic acid ions may be so bonded thereto that only one carboxyl group of each enters into the bond formation.

Similarly, where monobasic carboxylic acid ions are involved, it is not necessary that both ions be identical. In fact a dibasic and a monobasic acid ion may be bonded to the $(O=V)^{++}$ radical at the same time.

This is not to be understood, however, as meaning that all of the vanadyl salts which will polymerize ethylene in the presence of an aluminum alkyl are alike in their effect on the polymerization. For instance, a particular vanadyl salt may be more efficient insofar as rate of polymerization is concerned, but at the same time produce relatively higher quantities of low molecular weight waxes than another vanadyl salt.

For this reason, the preferred vanadyl salts are those having the general formula $(O=V)R_x$ where R is an alkyl or alkenyl carboxylic acid ion having at least two carbon atoms, an alkylene dicarboxylic acid ion having at least one carbon atom separating the carboxyl groups, a phenyl carboxyl acid ion, or a phenylene dicarboxylic acid ion, and $x$ has a value of 1 when both carboxylic groups are involved in bonding to the $(O=V)^{++}$ radical and a value of 2 when only one carboxylic group of any R group is linked to the $(O=V)^{++}$ radical. Thus these preferred vanadyl salts are the salts of carboxylic acids which contain only carbon, hydrogen and oxygen.

The particularly preferred vanadyl salts are those of acetic, propionic, 2-ethyl hexanoic, 2-ethyl butyric, adipic, benzoic, and maleic acid.

Several procedures for the preparation of vanadyl salts have been described in the chemical literature. Generally, however, the salts in the present invention may be prepared by reacting vanadyl acetate with the organic acids previously described. The vanadyl acetate used as the starting compound may be prepared by the reaction of $V_2O_5$ with acetic acid and acetic anhydride. Specific reaction conditions for the preparation of representative vanadyl salts are set forth in the examples infra.

The novel catalyst compositions are prepared by mixing the selected trialkyl aluminum compound with the selected vanadyl salt compound in an inert organic solvent such as toluene. Preferred molar ratios of aluminum to vanadium are in the range of about 1:1 to about 10:1, with a ratio of about 3 moles of aluminum to 1 mole of vanadium being the most preferred. In polymerization reactions carried out under pressure, an excess of trialkyl aluminum is found to be desirable to counteract impurities in the ethylene monomer. Generally, about 1 millimole of the aluminum trialkyl catalyst per liter of solvent medium containing the ethylene monomer is required assuming no impurities in the reaction system.

These impurities, principally water vapor, oxygen and carbon dioxide, irreversibly react with the trialkyl aluminum in the system concerned in this invention and effectively prevent its catalytic activity.

Preparation of typical vanadyl salt activators, complete trialkyl aluminum-vanadyl salt catalyst compositions, and specific experiments demonstrating the utility and performance of these catalytic compositions are presented in the following examples.

EXAMPLE I

A sample of vanadyl acetate which contained by analysis 27.0 percent vanadium was compared to 27.54 percent calculated for

was prepared by refluxing a mixture of 182 grams $V_2O_5$, 408 grams acetic anhydride, and 120 grams acetic acid for approximately 6 hours. The unreacted acetic acid and acetic anhydride were removed by vacuum distillation (0.5 mm. Hg) at 100° C. A vanadyl acetate residue yield of 372 grams was obtained as a greenish-gray solid.

EXAMPLE II

A sample of vanadyl adipate was prepared by a reaction of adipic acid with vanadyl acetate prepared according to the method of Example I. 37 grams (0.2 mole) of vanadyl acetate were mixed with 29.2 grams (0.2 mole) of adipic acid in a suitable container equipped with a distillation take-off and provided with means whereby a vacuum distillation could be carried out. The mixture of the two constituents was allowed to react at a temperature of 150° C. to 250° C. for several hours at atmospheric pressure until about 85 percent of the calculated acetic acid had distilled off. Vacuum distillation conditions were then established and the residual acetic acid, along with a small quantity of adipic acid, were removed. A yield of 42.4 grams of vanadyl adipate (calculated 42.2 grams) was obtained which analyzed as containing 24.0 percent vanadium as compared with 24.2 percent vanadium calculated for

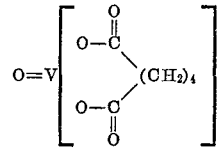

The vanadyl adipate was found to be substantially insoluble in a solution of triisobutyl or trimethyl aluminum.

EXAMPLE III

A sample of vanadyl benzoate was prepared by mixing 18.5 grams of dry vanadyl acetate with 50 grams of benzoic acid and placing it in a suitable container equipped with a distillation take-off. The container and contents were placed in an oil bath which was slowly heated to a temperature of 250° C. During the heating process approximately 10.5 grams of acetic acid was distilled off. A vacuum distillation removed most of the excess benzoic acid. The residual benzoic acid was removed from the vanadyl benzoate by extraction with boiling ether. The process yielded 30.5 grams of a yellow solid which analyzed as 16.5 percent vanadium as compared with 16.5 percent calculated for

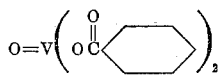

EXAMPLE IV

A catalyst composition was prepared from vanadyl acetate and triisobutyl aluminum according to the following method: A sample of vanadyl acetate prepared according to the method of Example I, was ground to a fine powder suspension under toluene in a steel vibratory ball mill. The suspension was diluted to a concentration of .075 gram vanadyl acetate per cc. toluene. 7.6 cc. of this suspension (0.57 gram vanadyl acetate) was added to a small, dry, argon filled bottle containing 50 cc. of triisobutyl aluminum-toluene solution containing 7.8 grams of triisobutyl aluminum. The vanadyl acetate dissolved with evolution of some heat to give a brownish-black solution. The composition proved to be an effective catalyst for the polymerization of ethylene.

EXAMPLE V

A polymerization of ethylene at atmospheric pressure and under isothermal conditions was carried out as follows: To a 1 liter Morton flask equipped with a suitable stirrer and containing 500 cc. of dry toluene was added 1.46 grams of vanadyl acetate and 4.75 grams of triisobutyl aluminum (as a 20 percent by volume solution in toluene). Ethylene was bubbled through the toluene for a period of 3 hours at atmospheric pressure with constant stirring and at a constant reaction temperature of 35° C. to 40° C. During this period approximately 24 grams of polyethylene was formed in string-like particles. The polyethylene product was separated from catalyst residues by washing with alcoholic sulfuric acid solution. The product purified in this manner showed a melt index of zero. An extraction with boiling cyclohexane for 16 hours, the weight loss due to dissolved low molecular weight wax was only 2.2 percent as compared with polyethylenes prepared with $TiCl_4$ co-catalysts (activators) which showed a wax content of from 7.5 to 14 percent by weight.

EXAMPLE VI

Polymerization of ethylene under pressure was carried out as follows: To a 2 liter stainless steel autoclave containing 1 liter of toluene was added 0.73 gram of vanadyl acetate and 2.38 grams of triisobutyl aluminum. Ethylene was forced into the autoclave until the total internal pressure was 500 pounds per square inch at 50° C. The reaction started immediately with evolution of heat which raised the temperature to about 125° C. in a period of approximately 45 minutes. As the catalyzed polymerization reaction subsided, the temperature dropped to 115° C. at which point external heat was applied to maintain the temperature between 115° C. to 145° C. The total reaction time was 3 hours. The polymeric material formed was washed first with ethanol containing a small amount of sulfuric acid, next with aqueous ethanol, and finally with anhydrous ethanol. A yield of 103 grams of polyethylene was obtained which had a melt index of zero and a density of 0.949 at 25° C. Infra-red analysis showed the product to contain a nil concentration of side chain groups, i.e., the polymer was very linear. Extraction with boiling cyclohexane showed the presence in the product of only 2.0 percent low molecular weight wax.

EXAMPLE VII

To a 2 liter stainless steel autoclave containing 1 liter of dry toluene was added a suspension of 0.53 gram finely ground vanadyl adipate and 2.85 grams triethyl aluminum in 20 cc. toluene. The autoclave was then charged with ethylene until an internal pressure of 200 to 300 pounds per square inch at 40° C. was obtained. The ethylene content as measured by this internal pressure in the autoclave was maintained for approximately 6 hours. In the early stages of the reaction the evolution of heat caused a rise in temperature to about 75° C. after which time the temperature slowly decreased to about 55° C. The yield of 173 grams of polyethylene was in the form of almost dry granules which were easily washed with alcohol. Extraction with boiling cyclohexane showed a wax content of only 0.8 percent.

EXAMPLE VIII

To a 2 liter stainless steel autoclave containing 1 liter of dry toluene was added 33 cc. of a catalyst composition made by dissolving 0.85 gram of vanadyl benzoate in 45 cc. of a 20 percent by volume solution of triisobutyl aluminum in toluene. The autoclave was then charged with ethylene until an internal pressure of 500 pounds per square inch at 35° C. was obtained. The reaction started immediately with the evolution of heat which raised the temperature of the system to 120° C. to 125° C. over a period of about 1 hour. As the reaction subsided, the temperature of the system was allowed to decrease to approximately 100° C. to 105° C. Maximum pressure attained in the autoclave was 640 pounds per square inch. At the end of 4 hours, the pressure had decreased to 310 pounds per square inch and the reaction was terminated. The yield of polyethylene after washing to remove catalyst residue and other impurities was 150 grams. Extraction with boiling cyclohexane indicated a wax content of 2.6 percent. A similar experiment using the same catalyst composition, reactant and experimental conditions was performed except that a reaction period of approximately 20 hours was allowed. The yield was increased approximately 25 percent.

Six additional polymerization experiments with ethylene were carried out under similar conditions and in similar apparatus as in Example V if the reaction is at atmospheric pressure, or in Example VI if the polymerization is under pressure. The results and pertinent data are shown in Table I below.

*Table I*

| Solvent | Activator | Weight in grams | Catalyst | Weight in grams | Reaction time, hours | Pressure | Reaction temp., ° C. range | Yield in grams |
|---|---|---|---|---|---|---|---|---|
| Toluene (500 cc.) | Vanadyl propionate | 1.71 | Triisobutyl aluminum | 4.75 | 3 | 1 atmosphere | 38–45 | 21 |
| Do | Vanadyl 2-ethyl hexoate | 2.80 | ----do---- | 4.75 | 3 | ----do---- | 36–48 | 16 |
| Do | Vanadyl 2-ethyl butyrate | 2.38 | ----do---- | 4.75 | 3 | ----do---- | 35–40 | 18 |
| Do | Vanadyl acetate | 0.73 | ----do---- | 2.38 | 6 | 6.8 to 13.6 atmospheres | 40–88 | 68 |
| Do | Vanadyl benzoate | 2.47 | ----do---- | 6.35 | 0.6 | 1 atmosphere | 20–40 | 10 |
| Do | Vanadyl maleate | 1.44 | ----do---- | 4.75 | 3 | ----do---- | 35–40 | 19 |

While polyethylene produced by conventional polymerization processes under atmospheric pressure using aluminum trialkyl and a vanadyl salt is quite linear and low in wax content, especially excellent properties are to be found in polyethylene produced under relatively high pressure conditions using the same catalyst compositions.

For instance, polyethylene, formed in the temperature range of about 50 to 145° C. under a pressure of about 500 p.s.i.g. using triisobutyl aluminum and vanadyl acetate as the catalyst material, contained a nil concentration of methyl branch chains as determined by infra-red analysis. This is indicative of extreme linearity, in fact somewhat better in this respect than a typical sample of high molecular weight polymethylene. The density at 25° C. was determined to be 0.949 and the melt index had a value of zero.

It is to be understood that the examples are included by way of illustration and are not intended to impose limitations on the scope of the invention. Since the novelty of the invention lies principally in the use of certain vanadyl salts as activators or co-catalysts along with conventional organo-aluminum catalysts, the conditions under which the polymerizations are carried out may vary greatly and still be within the scope of the present invention. This is particularly true in the case of temperature and pressure which may vary from 25° C. to 145° C. and from 1 atmosphere to 50 atmospheres respectively.

Generally, the catalyst compositions of the present invention are introduced into the polymerization reaction either dispersed in or dissolved in a suitable inert hydrocarbon liquid. By inert is meant that the hydrocarbon liquid is free from reactive groups such as hydroxyl, halogen, amino, and nitro as well as free from impurities such as oxygen and water. Hydrocarbon liquids suitable as an inert diluent or dispersant for the catalyst composition include purified heptane, octane, benzene, and toluene.

What is claimed is:

1. A catalyst composition for the polymerization of ethylene to form normally solid polyethylene, said catalyst composition consisting essentially of an organo-aluminum compound having the general formula AlR₃ where R is an organic hydrocarbon radical; and a vanadyl salt of a carboxylic acid, said carboxylic acid containing from 1 to 2 carboxyl groups and containing only carbon, hydrogen and oxygen.

2. A catalyst composition according to claim 1 in which said composition has a molar ratio of aluminum to vanadium in the range of from about 1:1 to about 10:1.

3. A catalyst composition as described in claim 2, in which the molar ratio of aluminum to vanadium is about 3:1.

4. A catalyst composition as described in claim 2, in which the vanadyl salt of a carboxylic acid has the general formula

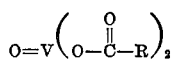

where R is an alkyl hydrocarbon radical.

5. A catalyst composition as described in claim 4, in which the alkyl hydrocarbon radical is selected from the group consisting of methyl, propyl, 2-ethylpentyl, 2-ethylbutyl and 2-ethylpropyl.

6. A catalyst composition as described in claim 2, in which the vanadyl salt of a carboxylic acid has the general formula

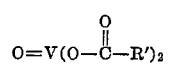

where R' is an alkenyl hydrocarbon radical.

7. A catalyst composition as described in claim 6, in which the vanadyl salt is vanadyl maleate.

8. A catalyst composition as described in claim 2, in which the vanadyl salt of a carboxylic acid has the general formula

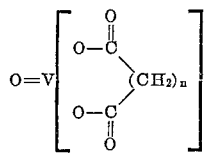

where $n$ has a value of at least 1.

9. A catalyst composition as described in claim 8, in which the vanadyl salt is vanadyl adipate.

10. A catalyst composition as described in claim 2, in which the vanadyl salt of a carboxylic acid has the general formula

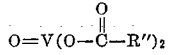

where R'' is an aryl hydrocarbon radical.

11. A catalyst composition as described in claim 10, in which the vanadyl salt is vanadyl benzoate.

12. Method for polymerizing ethylene to a polymer solid at room temperature which comprises bringing ethylene in contact with a catalyst composition consisting essentially of an aluminum trialkyl catalyst and a vanadyl salt of a carboxylic acid, said carboxylic acid containing from 1 to 2 carboxyl groups and containing only carbon, hydrogen and oxygen.

13. Method for polymerizing ethylene to a polymer solid at room temperature which comprises contacting ethylene with a catalyst composition consisting essentially of an aluminum trialkyl and the vanadyl salt of a carboxylic acid, said carboxylic acid containing from 1 to 2 carboxyl groups and containing only carbon, hydrogen and oxygen, said catalyst composition being dispersed in an inert hydrocarbon liquid, and having a molar ratio range of aluminum to vanadium from about 1:1 to about 10:1.

14. Method for polymerizing ethylene to a polymer solid at room temperature which comprises contacting ethylene at a temperature in the range of about 25° C. to about 155° C. and above atmospheric pressure with a catalytic amount of a composition consisting essentially of an aluminum trialkyl and the vanadyl salt of a carboxylic acid, said carboxylic acid containing from 1 to 2 carboxyl groups and containing only carbon, hydrogen and oxygen, said catalyst composition having a molar ratio range of aluminum to vanadium from about 1:1 to about 10:1.

15. Method according to claim 13, in which the vanadyl salt of a carboxylic acid has the general formula

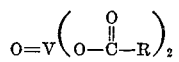

where R is an alkyl hydrocarbon radical.

16. Method according to claim 13, in which the vanadyl salt of a carboxylic acid is selected from the group consisting of vanadyl acetate, vanadyl propionate, vanadyl butyrate, vanadyl 2-ethylhexoate, vanadyl 2-ethylbutyrate, vanadyl adipate, vanadyl maleate, and vanadyl benzoate.

References Cited in the file of this patent

UNITED STATES PATENTS

| | | |
|---|---|---|
| 2,881,156 | Pilar et al. | Apr. 7, 1959 |
| 2,933,482 | Stampa | Apr. 19, 1960 |
| 2,940,964 | Mostardini | June 14, 1960 |
| 3,004,963 | Bartolomeo et al. | Oct. 17, 1961 |

FOREIGN PATENTS

| | | |
|---|---|---|
| 534,792 | Belgium | Jan. 31, 1955 |
| 546,846 | Belgium | Apr. 30, 1956 |